(12) United States Patent
Axelrad et al.

(10) Patent No.: US 7,835,965 B2
(45) Date of Patent: Nov. 16, 2010

(54) SYSTEM AND METHOD FOR PRIVATE EQUITY FUND FORMATION

(75) Inventors: Jonathan Axelrad, Cupertino, CA (US); Ping Ge, Foster City, CA (US); Phillip Hoare, Palo Alto, CA (US); Yunus Mohammad, San Jose, CA (US); Ajay B. Mummaneni, Sunnyvale, CA (US); Linda Waissar, Menlo Park, CA (US)

(73) Assignee: Wilson Sonsini Goodrich & Rosati, Palo Alto, CA (US)

( * ) Notice: Subject to any disclaimer, the term of this patent is extended or adjusted under 35 U.S.C. 154(b) by 862 days.

(21) Appl. No.: 10/164,072

(22) Filed: Jun. 6, 2002

(65) Prior Publication Data

US 2002/0188539 A1    Dec. 12, 2002

Related U.S. Application Data

(60) Provisional application No. 60/296,810, filed on Jun. 8, 2001.

(51) Int. Cl.
*G06Q 40/00* (2006.01)

(52) U.S. Cl. ............... 705/36 R; 705/37
(58) Field of Classification Search ......... 705/59, 705/67, 70, 72, 75, 80, 18, 35–37, 38, 44, 705/36 R
See application file for complete search history.

(56) References Cited

U.S. PATENT DOCUMENTS

| | | | | |
|---|---|---|---|---|
| 5,126,936 A | * | 6/1992 | Champion et al. | 705/36 |
| 5,677,955 A | * | 10/1997 | Doggett et al. | 705/76 |
| 5,758,097 A | * | 5/1998 | Debe et al. | 705/35 |
| 5,774,879 A | * | 6/1998 | Custy et al. | 705/35 |
| 5,787,405 A | * | 7/1998 | Gregory | 705/45 |
| 5,866,889 A | * | 2/1999 | Weiss et al. | 235/379 |
| 5,940,843 A | * | 8/1999 | Zucknovich et al. | 715/210 |
| 5,946,667 A | * | 8/1999 | Tull et al. | 705/36 |
| 5,983,204 A | * | 11/1999 | Debe | 705/36 |
| 6,021,202 A | * | 2/2000 | Anderson et al. | 705/54 |
| 6,092,056 A | * | 7/2000 | Tull et al. | 705/36 |
| 6,213,391 B1 | * | 4/2001 | Lewis | 235/380 |
| 6,327,656 B2 | * | 12/2001 | Zabetian | 713/176 |
| 6,415,267 B1 | * | 7/2002 | Hagan | 705/35 |

(Continued)

OTHER PUBLICATIONS

Anonymous, Private equity investments require skilled and sensitive legal work. Asiamoney. London: Mar. 1999. vol. 10, Iss. 2; p. 26, 4 pgs.*

(Continued)

*Primary Examiner*—Stefanos Karmis
(74) *Attorney, Agent, or Firm*—Carr & Ferrell LLP

(57) ABSTRACT

A system for private equity fund formation comprises an equity fund application and a memory configured to store fund documents. Access to the fund documents is managed by the equity fund application according to the status of a user as a general partner, an investor, or a placement agent, which is embodied in an authorization code. Fund documents are organized according to fund firm, fund family, and specific fund. The equity fund application includes an agreement engine that automatically creates agreement documents based on information entered by a user in response to a questionnaire. In one embodiment, the equity fund application and the memory are implemented in an application server. Users interact with the equity fund application in the application server via a network and an access server.

17 Claims, 12 Drawing Sheets

U.S. PATENT DOCUMENTS

| | | | | |
|---|---|---|---|---|
| 6,484,151 | B1 * | 11/2002 | O'Shaughnessy | 705/36 |
| 6,571,219 | B1 * | 5/2003 | Spivey | 705/36 |
| 6,721,783 | B1 * | 4/2004 | Blossman et al. | 709/206 |
| 7,275,046 | B1 * | 9/2007 | Tritt et al. | 705/36 R |
| 7,386,494 | B1 * | 6/2008 | Rose et al. | 705/36 R |
| 2001/0018739 | A1 * | 8/2001 | Anderson et al. | 713/176 |
| 2001/0042036 | A1 * | 11/2001 | Sanders | 705/36 |
| 2002/0019798 | A1 * | 2/2002 | Gajendragadkar | 705/37 |
| 2002/0035531 | A1 * | 3/2002 | Push | 705/36 |
| 2002/0046154 | A1 * | 4/2002 | Pritchard | 705/37 |
| 2002/0128939 | A1 * | 9/2002 | Tarrant | 705/35 |
| 2002/0188539 | A1 * | 12/2002 | Axelrad et al. | 705/35 |
| 2003/0046207 | A1 * | 3/2003 | Torre et al. | 705/36 |

OTHER PUBLICATIONS

Website of IntraLinks, Inc., URL: www.intralinks.com/ Publication Date Unknown, Download Date: Sep. 3, 2002.

Website on Intuit, Inc., URL: www.turbotax.com/ (resolves to www.quicken.com/taxes/) Publication Date Unknown, Download Dates: Sep. 3, 2002 and Sep. 5, 2002.

* cited by examiner

SYSTEM AND METHOD FOR PRIVATE EQUITY FUND FORMATION

CROSS-REFERENCE TO RELATED APPLICATION

This application claims the benefit of U.S. Provisional Patent Application No. 60/296,810, entitled "Private Equity Fund Formation Method and System," filed on Jun. 8, 2001. The subject matter of the related application is hereby incorporated by reference. The related applications are commonly assigned.

BACKGROUND OF THE INVENTION

1. Field of the Invention

This invention relates generally to financial services and more particularly to a system and method for private equity fund formation.

2. Description of the Background Art

The creation of private equity funds is time consuming and complex. The disbursement of documents in a timely manner to individuals participating in the private equity fund raising process presents challenges. Difficulties are presented because there is no centralized authority that knows all of the participants in the process who need access to the documents, and no ability to deliver such documents in a timely manner.

Current practices involve attorneys preparing the documents and then delivering them on paper or via email to general partners. The general partners, in turn, deliver the documents in paper form or by email to investors. The investors then forward the documents to their representatives, including but not limited to investment advisors, accountants, and attorneys. The documents are then routed to individuals within the investor's representatives' organizations who are responsible for the actual completion of the task on behalf of the investor. Distribution of relevant documents is a complex, multi-step chain of relationships that requires documents to travel many routes.

Current securities laws are complex and to comply with them, private equity general partners need a substantial amount of information from each investor. Private equity general partners usually receive certain detailed information relating to investors via a subscription agreement, which contain complex questionnaires. Such a questionnaire typically includes numerous questions many of which may not be applicable to a particular investor, increasing the possibility of errors. Each investor completes and signs a subscription agreement, then forwards it to the general partners' attorneys. The information in the subscription agreement is summarized in a spreadsheet by the attorneys, and then made available to the general partners. For institutional investors, a more junior individual completes the questionnaire for the subscription agreement, which is then reviewed by a more senior individual with signatory authority. The typical subscription agreement process may take a week or more to complete. There is a need to an improved system and method for private equity fund formation.

SUMMARY OF THE INVENTION

In accordance with the present invention, a system and method are disclosed to implement private equity fund formation. The system of the invention includes an equity fund application and a memory configured to store fund documents. Access to the fund documents is managed by the equity fund application according to the status of a user as a general partner, an investor, or a placement agent, which is embodied in an authorization code. Fund documents are organized according to fund firm, fund family, and specific fund. The equity fund application includes an agreement engine that automatically creates agreement documents based on information entered by a user in response to a questionnaire. In one embodiment, the equity fund application and the memory are implemented in an application server. Users interact with the equity fund application in the application server via a network and an access server.

The equity fund application also includes an email interface configured to allow certain users to create an email message and address it to any number of other users of the system. The email interface allows certain users to address an email message by category of user, individual user, or both. The email interface is further configured to automatically generate an email message containing an authorization code when a participant is added to the system.

The method of the invention includes accessing a website, registering as a user of the website using a user name and password, entering an authorization code, selecting a fund family, viewing a fund family home page, and interacting with the fund family home page to view fund documents. The authorization code determines which fund documents are available for view. The method further includes interacting with the fund family home page to create an agreement. A user provides responses to a questionnaire, where questions presented to the user depend upon the user's responses to previous questions. An agreement is automatically created based upon responses to the questionnaire.

The authorization code of the invention controls a user's access to fund information including fund documents. Each authorization code represents a specific fund family and a specific general partner, a specific investor, or a specific placement agent. Authorization codes are not completely confidential, as they can be shared with different individuals affiliated with an investor, general partner, or placement agent. An authorization code can be used by affiliated individuals where each individual is a separate registered user.

DETAILED DESCRIPTION OF THE INVENTION

Figure 1:
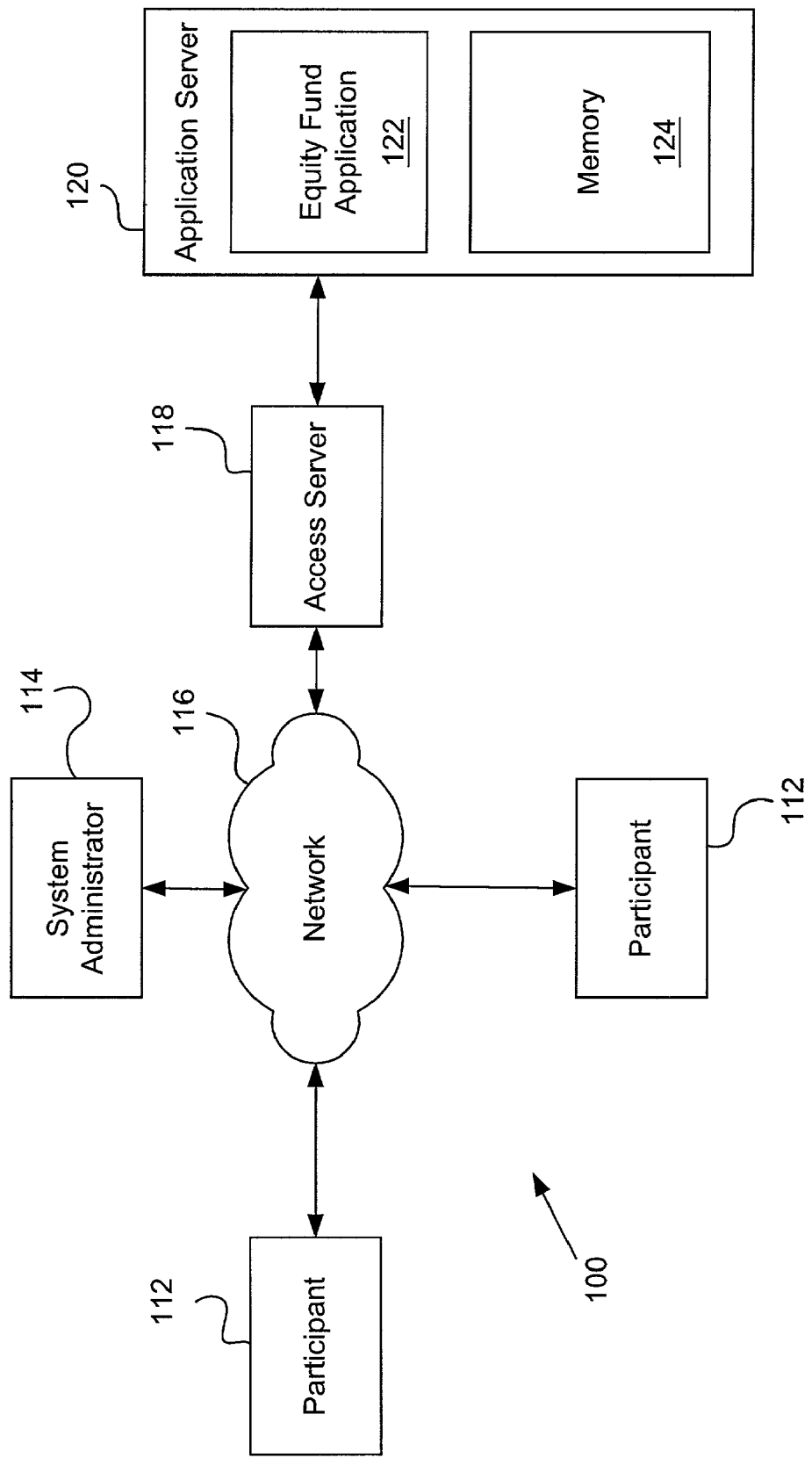
FIG. 1 is a block diagram of one embodiment of an electronic network system, in accordance with the present invention.

FIG. 1 is a block diagram of one embodiment of an electronic network system 100, in accordance with the present invention. System 100 includes, but is not limited to, participants 112, a system administrator 114, a network 116, an access server 118, and an application server 120. Participants 112 communicate via network 116 and access server 118 with application server 120. Network 116 may be any type of electronic communication network, including but not limited to, a Local Area Network (LAN), a Wide Area Network (WAN), an intranet, an internet, and a wireless network. In the preferred embodiment, access server 118 is a web server that provides for secure communications.

Application server 120 includes, but is not limited to, an equity fund application 122 and a memory 124. Equity fund application 122 includes various software modules for initiating and managing the formation of private equity funds, and is further discussed below in conjunction with FIG. 2. Memory 124 stores documents and other information used in the formation of the private equity funds, and is further discussed below in conjunction with FIG. 3.

Participants 112 are individuals involved in the formation of private equity funds, including, but not limited to, investors, placement agents, and general partners. Although only two participants 112 are shown in FIG. 1, any number of participants is within the scope of the invention. Participants 112 may be legal entities or individuals. Each individual user of system 100 has some type of relationship with a participant 112 or system administrator 114. For example, a user of system 100 may be an employee of a corporate investor, an advisor to an investor, an attorney for a general partner, an employee of a placement agent, or an employee of system administrator 114.

Figure 2:
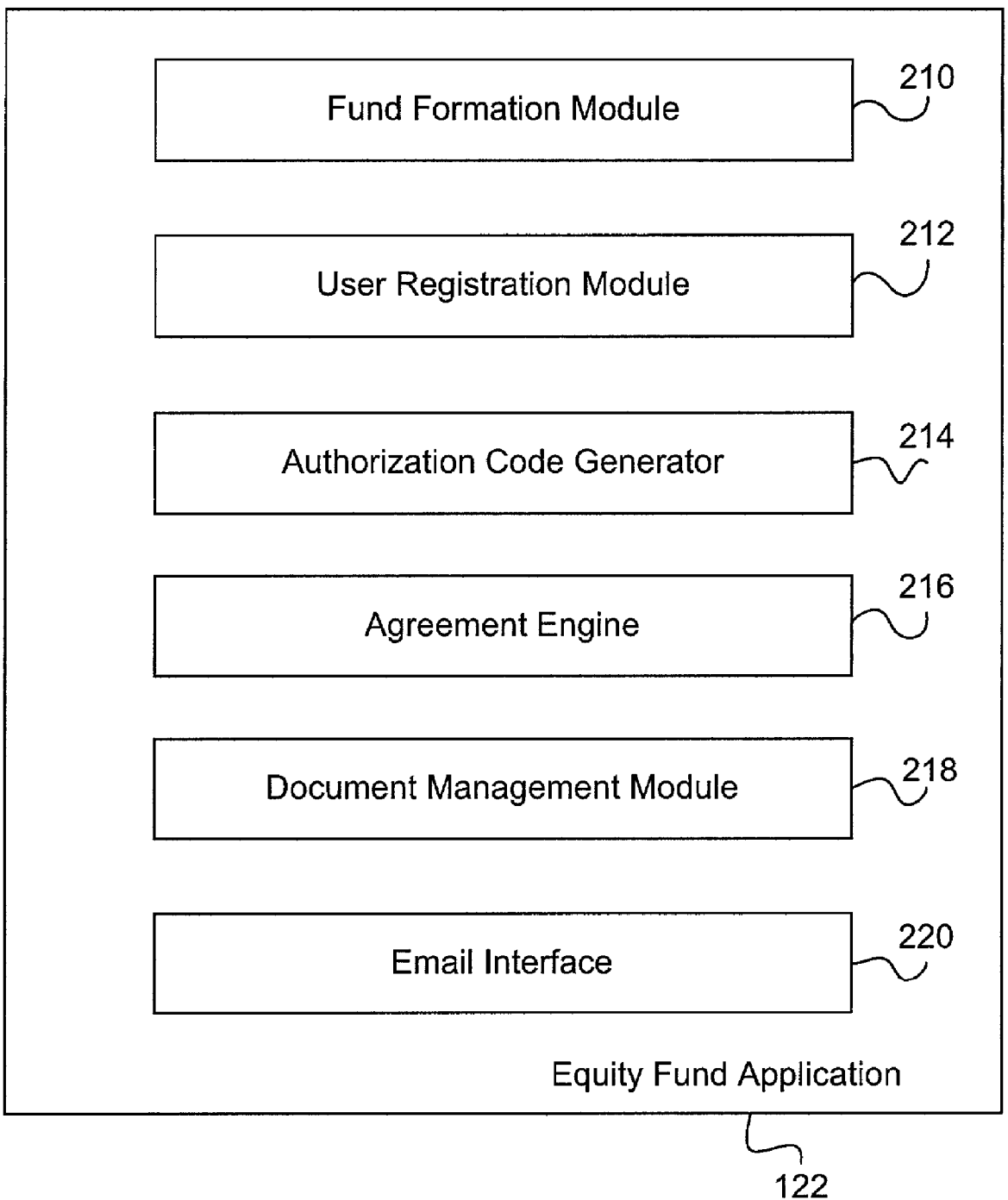
FIG. 2 is a block diagram of one embodiment of the equity fund application of FIG. 1, in accordance with the invention.

FIG. 2 is a block diagram of one embodiment of equity fund application 122 of FIG. 1, in accordance with the invention. Equity fund application 122 includes, but is not limited to, a fund formation module 210, a user registration module 212, an authorization code generator 214, an agreement engine 216, a document management module 218, and an email interface 220. Fund formation module 210 creates web pages accessible by participants 112 and system administrator 114, and operates in conjunction with the other modules of equity fund application 122 to implement the invention. User registration module 212 registers all users of system 100 with a user identification and a password. New users register by providing user profile information, agreeing to terms of use, and choosing a user identification and a password.

Authorization code generator 214 generates authorization codes that provide access to documents and to features of equity fund application 122. Authorization codes are generated for participant 112 and each fund family. An authorization code represents access of a particular participant 112 for a particular fund family. Authorization codes are not completely confidential, as they can be shared with different individuals affiliated with an investor or general partner. For example, if an investor is a legal entity such as a corporation, authorization code generator 214 generates an authorization code for a particular fund family and that investor. The authorization code can then be used by appropriate individuals within the investor corporation to interact with equity fund application 122, where each user separately registers using user registration module 212. An individual may use different authorization codes to work with a particular fund family in different capacities. For example, an individual may represent a legal entity as an investor and may also be a personal investor in the same fund family. Authorization code generator 214 generates a new authorization code when a new general partner, investor, or placement agent is added to system 100 for a specific fund family. Authorization code generator 214 operates in conjunction with email interface 220 to automatically send new authorization codes to the new participant 112. In one embodiment, each authorization code includes at least six characters, at least one of which must be a letter and at least one of which must be a number. Users may choose to deactivate an authorization code, such that the user no longer automatically receives emails when new documents are published to system 100 for that fund family. Authorization codes can be reactivated at any time without reentering the authorization code.

Agreement engine 216 automates the creation of financial agreements such as subscription agreements for a private equity fund. The functionality of agreement engine 216 is further discussed below in conjunction with FIG. 9. Document management module 218 manages publishing and access to documents stored in memory 124. Document management module 218 manages access rights to documents according to authorization codes entered by users. The access rights of a document are established during the document publication process. System administrator 114 publishes documents to system 100 using document management module 218. The functionality of document management module 218 is further discussed below. Email interface 220 accesses an email application (not shown) to send email to various participants. Email interface 220 allows users to send email messages to other users by selecting categories of participants 112 (e.g., all general partners), individual users, or a combination.

Figure 3:
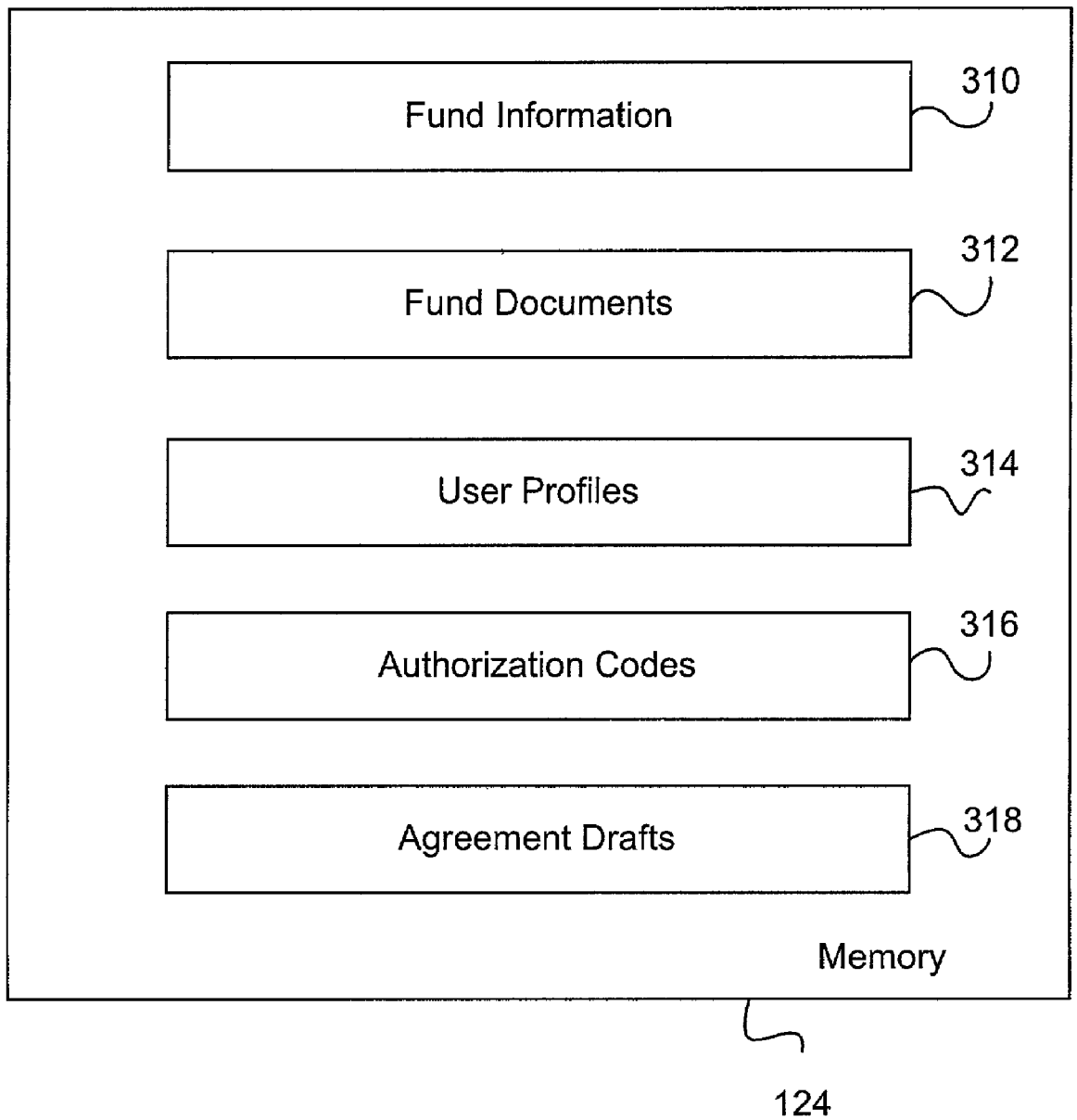
FIG. 3 is a block diagram of one embodiment of the memory of FIG. 1, in accordance with the invention.

FIG. 3 is a block diagram of one embodiment of memory 124 of FIG. 1, in accordance with the invention. Memory 124 includes, but is not limited to, fund information 310, fund documents 312, user profiles 314, authorization codes 316, and agreement drafts 318. Fund information 310 includes organizational information regarding fund firms, fund families within each firm, and specific funds within each fund family. Fund information 310 also contains an index of which documents in fund documents 312 are associated with which fund. User profiles 314 stores user profile information including name, contact information, and relationship to an investor, general partner, or placement agent. Authorization codes 316 stores authorization codes generated by authorization code generator 214 and the fund family and investor, general partner, or placement agent associated with each authorization code. Agreement drafts 318 store financial agreements that have been created using agreement engine 216.

Figure 4:
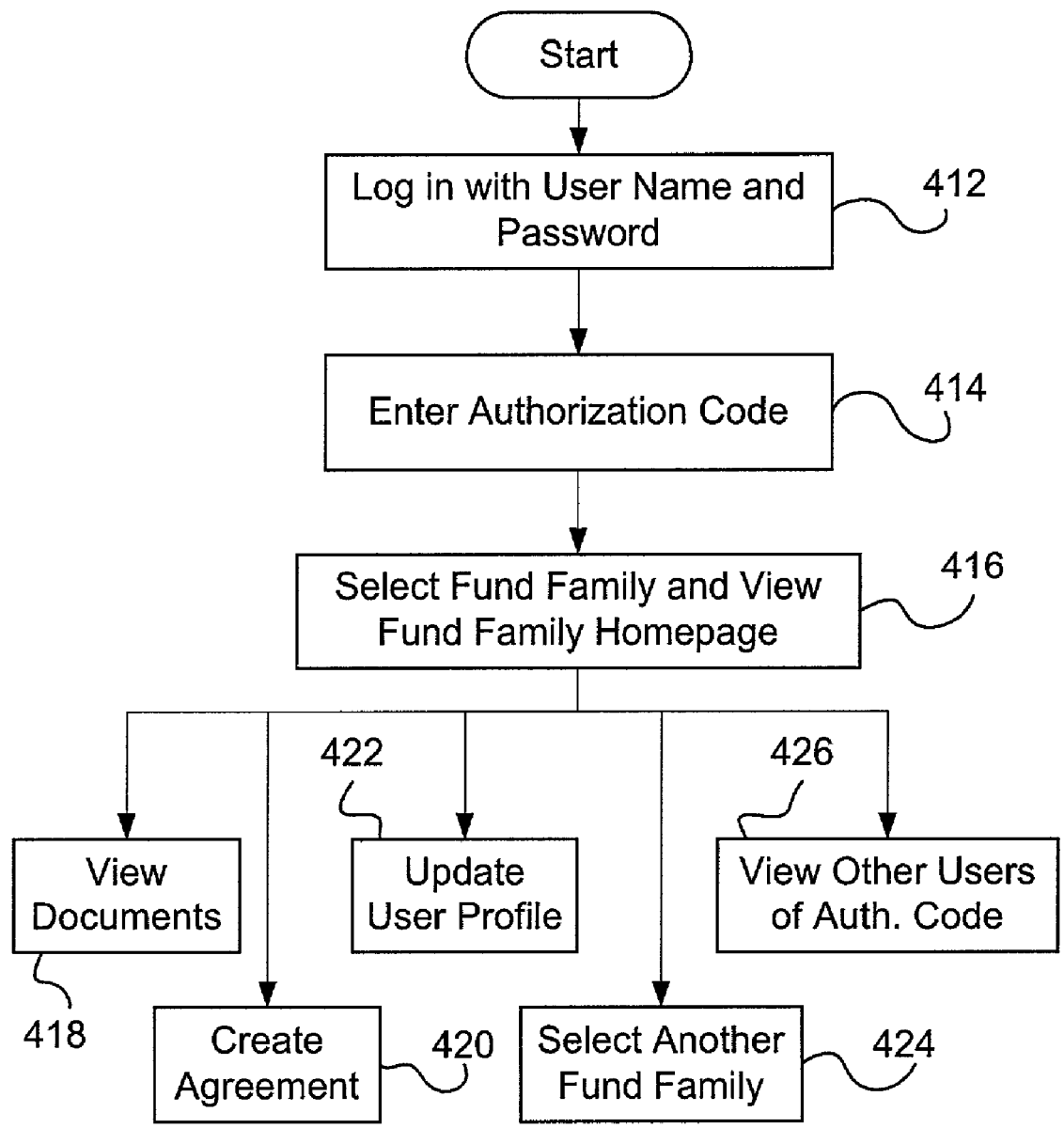
FIG. 4 is a flowchart illustrating interaction of an investor with the equity fund application of FIG. 1, in accordance with one embodiment of the invention.

FIG. 4 is a flowchart illustrating interaction of an investor with equity fund application 122 of FIG. 1, in accordance with one embodiment of the invention. In step 412, the investor logs in using the user name and password. If the investor has not previously registered, he or she will enter user profile information which will be stored by user registration module 212 in user profiles 314. Next, in step 414, the investor enters an authorization code that provides access to documents for a specific fund family. Once an authorization code has been entered, the user does not need to enter it again. Each time a user logs in to system 100, additional authorization codes may be entered.

Then, in step 416, the investor selects a fund family from all of the fund families available based on authorization codes entered by the investor. After selecting the fund family, fund formation module 210 presents the investor with the fund family home page. The fund family home page presents the investor with various options. In step 418, the investor may view documents stored in fund documents 312. The investor is only able to view documents for which he or she has access based on an entered authorization code. In step 420, the investor may create or edit an agreement using agreement engine 216. In step 422, the investor may update the user profile data in user profiles 314. In step 424, the investor may select another fund family. In step 426, the investor may view other users of the same authorization code. These other users are individuals that have been given the investor's authorization code for this particular fund family.

The steps of FIG. 4 apply to any user who has been given access to an investor's authorization code. For example, an investor corporation may have several individuals as registered users that utilize the same authorization code. In another example, an individual investor may share an authorization code with a financial advisor, attorney, accountant, or other advisor, who then registers with system 100 as a user and will have the same options available as the individual investor.

Figure 5:
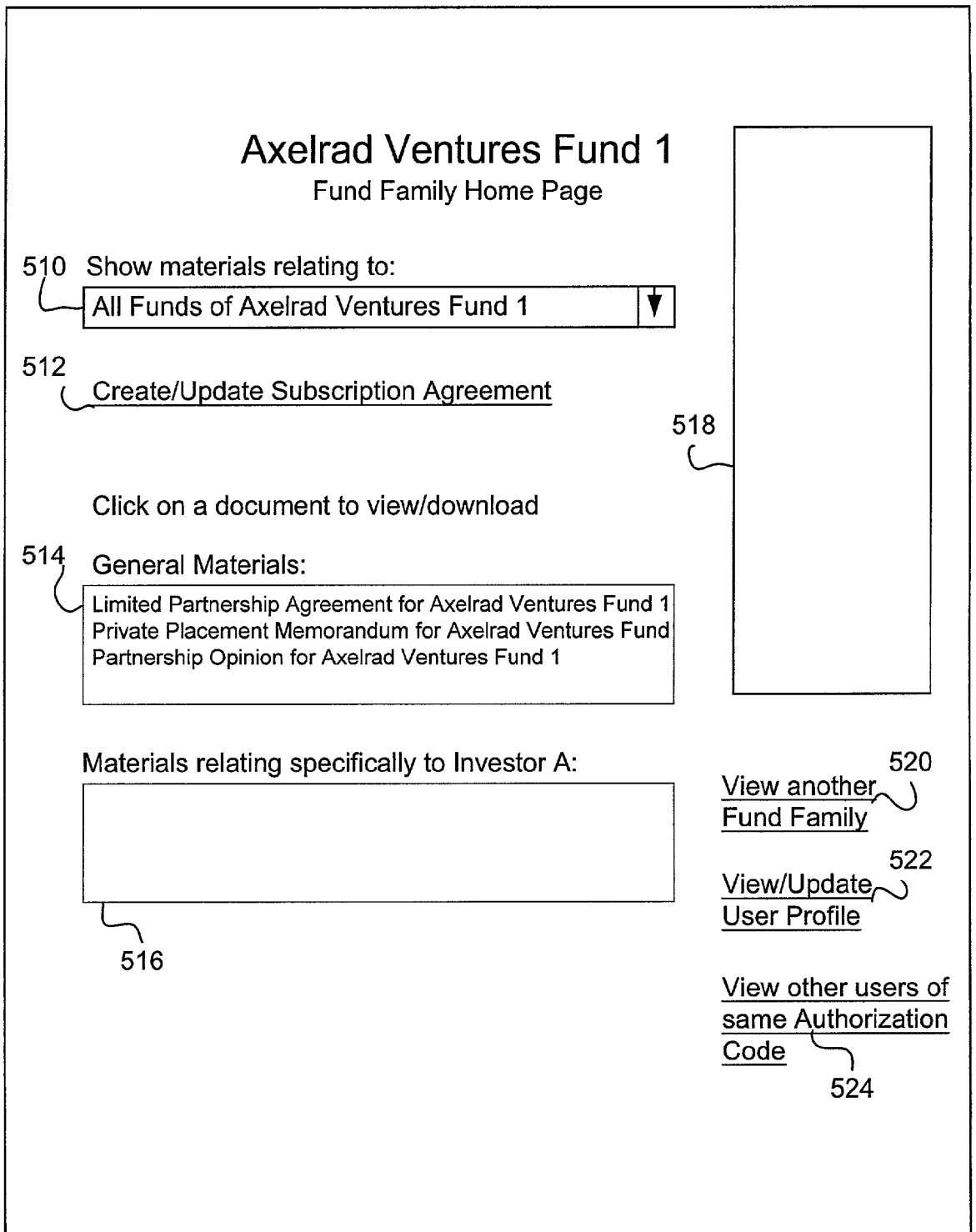
FIG. 5 is a diagram of one embodiment of a fund family home page, in accordance with the invention.

FIG. 5 is a diagram of one embodiment of a fund family home page 500, in accordance with the invention. Fund family home page 500 is available to users with an authorization code generated for an Axelrad Ventures Fund 1 fund family and an investor A. A first pane 510 shows the available funds in the fund family. The user may click on the down arrow to view more funds in the fund family. A general materials pane 514 contains the names of documents categorized as general materials for the selected fund by document management module 218. The user clicks on a name of a document to view or download the document. An investor materials pane 516 contains the names of documents specific to investor A which would not be available to other investors in Axelrad Ventures Fund 1. A side area 518 shows information relating to the user, such as user name, investor name, relationship to investor, authorization code for this fund family, and access level.

Besides viewing documents, fund family home page 500 also allows the user to perform various actions. The user may click on a link 512 to access agreement engine 216 and create or update a subscription agreement. Other embodiments of fund family home page 500 may enable creation of other types of agreements. The user may click on a link 520 to view another fund family. Clicking on link 520 causes fund formation module 210 to present a web page that lists all fund families available to the user. A link 522 allows the user to view and update his or her user profile information in user profiles 314. A link 524 allows the user to view other users that have entered the same authorization code that provides access to fund family home page 500.

If investor A has Most Favored Nation (MFN) status, an MFN pane (not shown) will appear on fund family home page 500 to provide access to documents available under MFN status. An MFN investor automatically has access to every document that is published to system 100 with MFN status.

Figure 6:
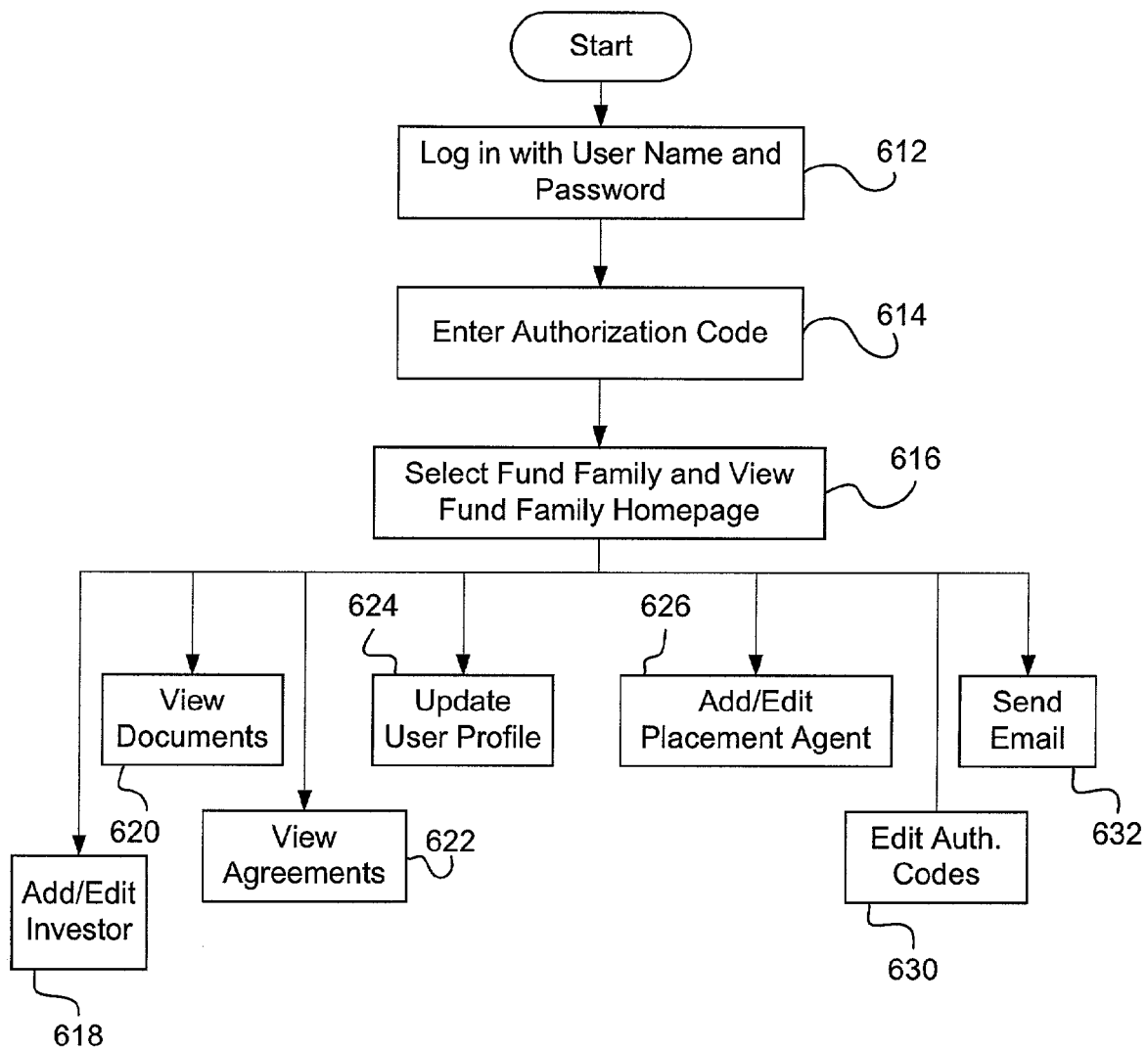
FIG. 6 is a flowchart illustrating interaction of a general partner with the equity fund application of FIG. 1, in accordance with one embodiment of the invention.

FIG. 6 is a flowchart illustrating interaction of a general partner with equity fund application 122 of FIG. 1, in accordance with one embodiment of the invention. In step 612, the general partner logs in using the user name and password. If the general partner has not previously registered, he or she will enter user profile information which will be stored by user registration module 212 in user profiles 314. In step 614, the general partner enters an authorization code that provides access to documents for a specific fund family. Once an authorization code has been entered, fund formation module associates the authorization code with the user's user name and the user does not need to enter it again. Each time a user logs in to system 100, additional authorization codes may be entered.

Then, in step 616, the general partner selects a fund family from all of the fund families available based on authorization codes entered by the general partner. After selecting the fund family, fund formation module 210 presents the general partner with the fund family home page. The fund family home page presents the general partner with various options. In step 618, the general partner may add a new investor to the fund family or edit the information for an existing investor using fund formation module 210. When adding a new investor, the general partner enters the investor name and contact information, including an email address. The general partner also indicates whether the new investor has a pre-existing substantive relationship with the fund or that the new investor is a non-U.S. person. The general partner also indicates whether the new investor is entitled to "Most Favored Nation" (MFN) status within system 100. MFN status allows an investor to view any document designated as available with MFN status, such as side letters between the general partner and other investors. Once an investor has been added for a particular fund family, authorization code generator 214 generates an authorization code specific to that investor and fund family. Email interface 220 then automatically generates an email including the authorization code that is sent to the new investor.

In step 620, the general partner may view documents stored in fund documents 312. The general partner has access to all general materials for the fund family, all materials specific to the general partner, all materials specific to all investors in the fund family, all agreement drafts, and other materials such as confidential memoranda prepared by the general partner's legal counsel. The general partner may also view a spreadsheet generated by fund formation module 210 that summarizes the information in agreements created by investors. Fund formation module 210 updates the spreadsheet whenever a new agreement is created. In step 622, the general partner can view agreements created by investors using agreement engine 216. In step 624, the general partner may update user profile information.

In step 626, the general partner may add or edit placement agents with system 100. The general partner decides whether the new placement agent can view the entire list of registered investors or only the list of investors that the placement agent has added to system 100. In step 630, the general partner may edit authorization codes of investors and placement agents. If the general partner instructs authorization code generator 214 to generate a new authorization code for an investor or placement agent, the new authorization code is automatically emailed to the affected individuals. In step 632, the general partner may create, address, and send email to any number of registered users of system 100.

In another embodiment of the invention, there are two levels of general partners. A super general partner has available all of the options as shown in FIG. 6. A regular general partner has available all of the options as shown in FIG. 6 except for adding or editing investors and adding or editing placement agents.

The steps of FIG. 6 apply to any user who has been given access to a general partner's authorization code. For example, a general partner entity may have several individuals as registered users that utilize the same authorization code. In another example, a general partner may share an authorization code with a financial advisor, attorney, accountant, or other advisor, who then registers with system 100 as a user and will have the same options available as the general partner.

Figure 7:
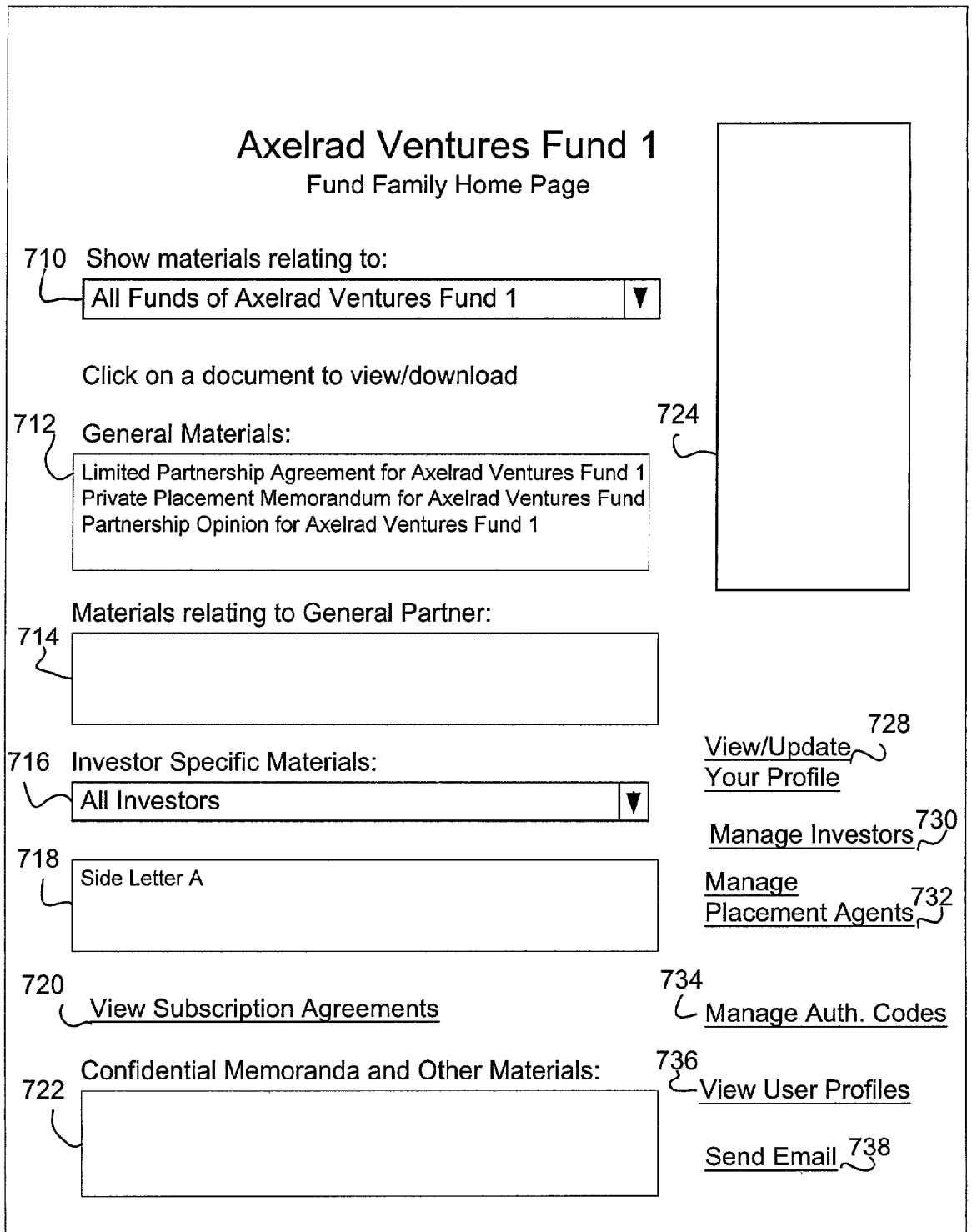
FIG. 7 is a diagram of another embodiment of a fund family home page, in accordance with the invention.

FIG. 7 is a diagram of one embodiment of a fund family home page 700, in accordance with the invention. Fund family home page 700 is available to users with an authorization code generated for an Axelrad Ventures Fund 1 fund family and a general partner. A first pane 710 shows the available funds in the fund family. The user may click on the down arrow to view more funds in the fund family. A general materials pane 712 contains the names of documents categorized as general materials for the selected fund by document management module 218. The user clicks on a name of a document to view or download the document. A general partner materials pane 714 contains the names of documents specific to the general partner and not available to investors or placement agents. An investor pane 716 allows the general partner to select all investors or a specific investor. An investor materials pane 718 contains the names of documents specific to investors which would not be available to other investors in Axelrad Ventures Fund 1. The document names that appear in pane 718 correspond to the text displayed in pane 716. A view subscription agreements link 720 allows the general partner to access agreements created by investors. A confidential memoranda and other materials pane 722 contains the names of documents, such as confidential memoranda prepared by the general partner's legal counsel, that are accessible only by the general partner.

A side area 724 shows information relating to the user, such as user name, general partner name, relationship to general partner, authorization code, and access level. Besides viewing documents, fund family home page 700 also allows the user to perform various actions. A link 728 allows the user to view and update his or her user profile information in user profiles 314. A link 730 allows the user to manage investors by adding new investors or editing information for existing investors. A link 732 allows the user to manage placement agents by adding new placement agents or editing information for existing placement agents. A link 734 allows the user to manage authorization codes. A link 736 allows the user to view, but not edit, user profiles for all other registered users of system 100. A link 738 allows the user to send email to other users of system 100 using email interface 220.

Figure 8:
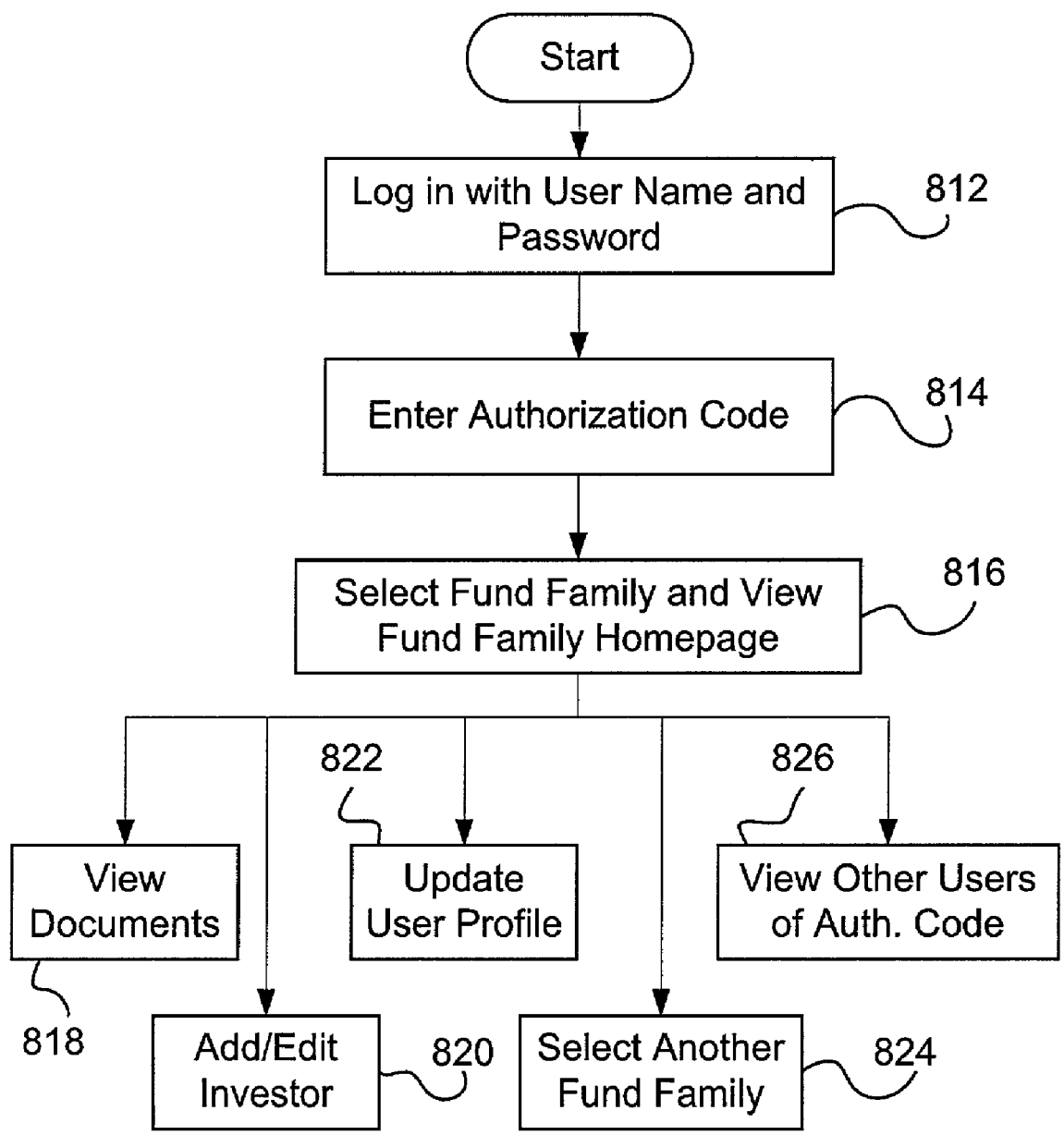
FIG. 8 is a flowchart illustrating interaction of a placement agent with the equity fund application of FIG. 1, in accordance with one embodiment of the invention.

FIG. 8 is a flowchart illustrating interaction of a placement agent with equity fund application 122 of FIG. 1, in accordance with one embodiment of the invention. In step 812, the placement agent logs in using a user name and password. If the placement agent has not previously registered, he or she will enter user profile information which will be stored by user registration module 212 in user profiles 314. The placement agent then enters an authorization code that informs fund formation module 212 that the user is a placement agent for a specific fund family. Fund formation module 212 associates the authorization code with the user's user name so that the user only needs to enter the authorization code once. Then, in step 816, the user selects a fund family and views the fund family home page generated by fund formation module 210.

The fund family home page presents the placement agent with various options. In step 818, the placement agent may view documents in fund documents 312 as determined by document management module 218 according to the placement agent's authorization code. In step 820, the placement agent may add a new investor or edit an existing investor for the fund family. The placement agent adds an investor in the same way as a general partner, except that the placement agent cannot grant an investor MFN status. The placement agent can view and edit the profiles of investors the placement agent has added to system 100, and may also be able to view the profiles of other investors as determined by the general partner.

In step 822, the placement agent may update his or her own user profile. In step 824, the placement agent may select another fund family. In step 826, the placement agent may view other users of the same authorization code.

The steps of FIG. 8 apply to any user who has been given access to a placement agent's authorization code. For example, a placement agent organization may have several employees as registered users that utilize the same authorization code.

Figure 9:
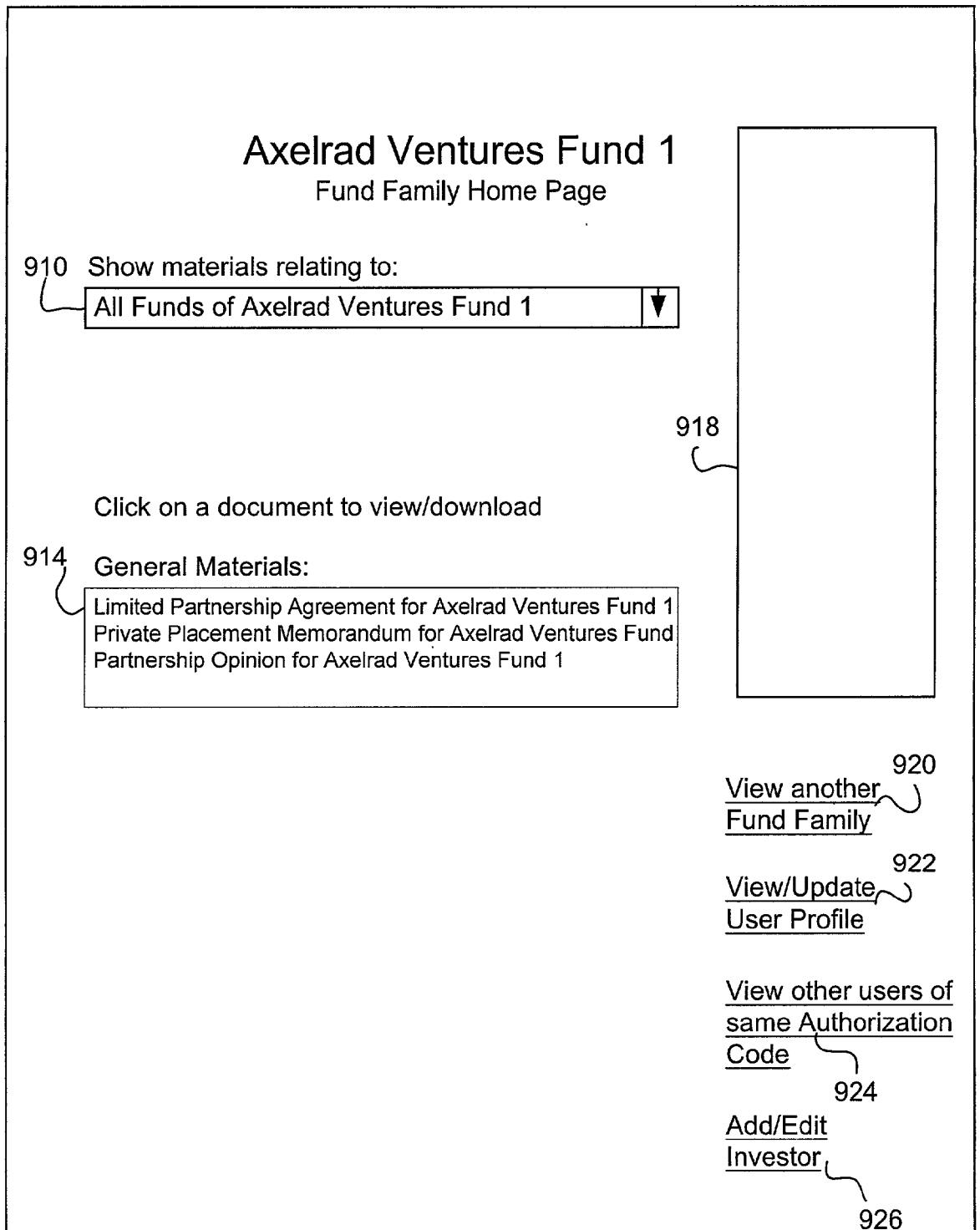
FIG. 9 is a diagram of another embodiment of a fund family home page, in accordance with the invention.

FIG. 9 is a diagram of another embodiment of a fund family home page 900, in accordance with the invention. Fund family home page 900 is available to users with an authorization code generated for Axelrad Ventures Fund 1 and a placement agent. A first pane 910 shows the available funds in the fund family. The user may click on the down arrow to view more funds in the fund family. A general materials pane 914 contains the names of documents categorized as general materials for the selected fund by document management module 218. The user clicks on a name of a document to view or download the document. A side area 918 shows information relating to the user, such as user name, placement agent name, authorization code for this fund family, and access level.

Besides viewing documents, fund family home page 900 also allows the user to perform various actions. The user may click on a line 920 to view another fund family. Clicking on link 920 causes fund formation module 210 to present a web page that lists all fund families available to the user. A link 922 allows the user to view and update his or her user profile information in user profiles 314. A link 924 allows the user to view other users that have entered the same authorization code that provides access to fund family home page 900.

A link 926 allows the user to add new investors to the fund family. When adding a new investor, the placement agent enters the investor name and contact information, including an email address. The placement agent also indicates whether the new investor has a pre-existing substantive relationship with the fund or that the new investor is a non-U.S. person. Once an investor has been added for a particular fund family, authorization code generator 214 generates an authorization code specific to that investor and fund family. Email interface 220 then automatically generates an email including the authorization code that is sent to the new investor. Link 926 also allows the user to view and edit the profiles of existing investors added to the fund family by the placement agent. The user may also be able to view the profiles of other investors if given that option by the general partner.

Figure 10:
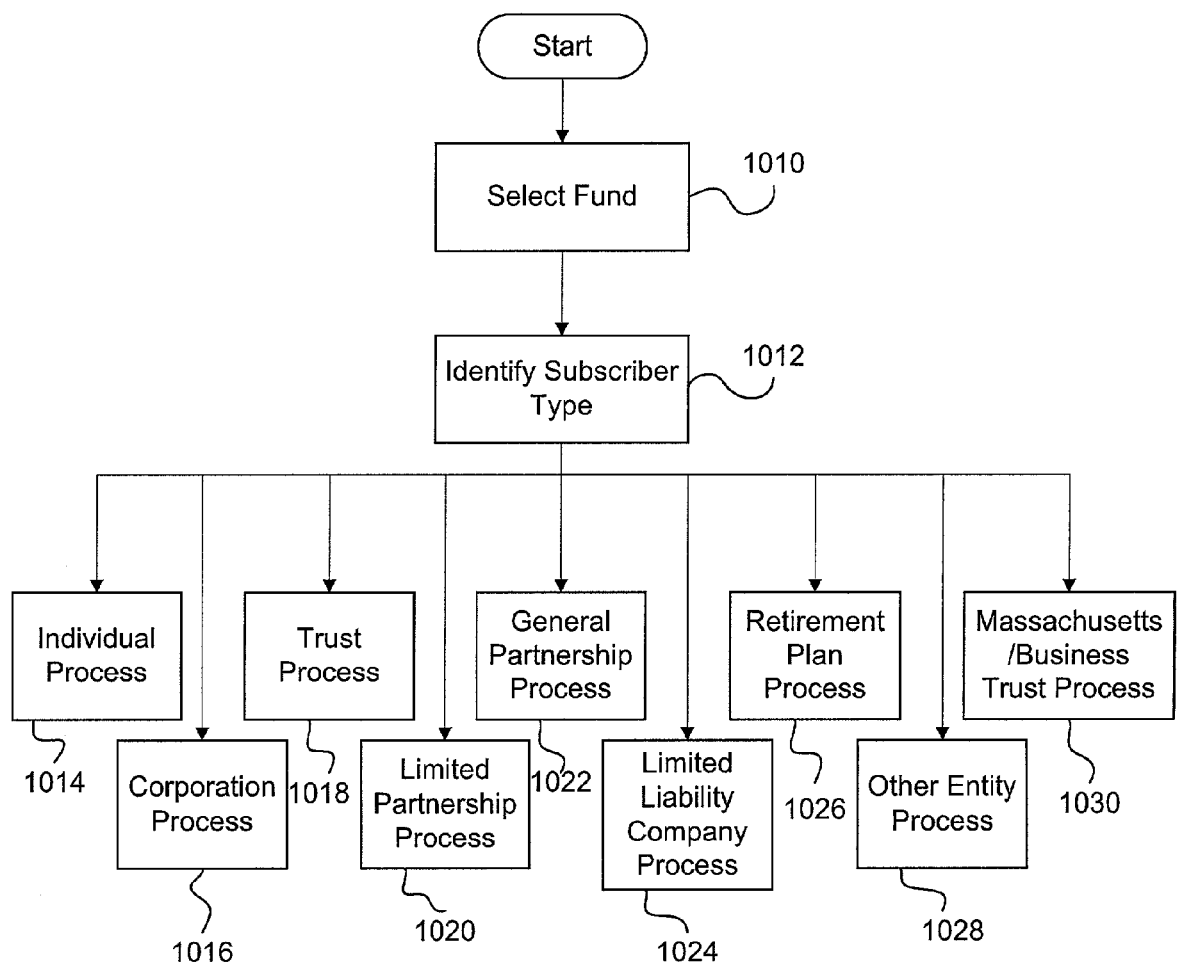
FIG. 10 is a flowchart illustrating one embodiment of an agreement generation process, in accordance with the invention.

FIG. 10 is a flowchart illustrating one embodiment of an agreement generation process, in accordance with the invention. After a user of system 100 views a fund family home page and clicks on the link to create or view an agreement, fund formation module 210 generates a web page that shows all current drafts of agreements and a link to create a new agreement. When the user clicks on the link to create a new agreement, agreement engine 216 in conjunction with fund formation module 210 presents the user with a series of web pages that enable the user to quickly and easily respond to a questionnaire. Agreement engine 216 then uses the responses to the questionnaire to create an agreement document. For example, agreement engine 216 determines whether an investor is a qualified purchaser or a non-qualified purchaser based on the investor's responses to the questionnaire, and if the investor is a non-qualified purchaser, determines the number of participants the investor is treated as under the Investment Company Act of 1940.

In step 1010, the user begins responding to the questionnaire by selecting a fund from the fund family. Then, in step 1012, the user identifies a subscriber type for the fund. If the user selects an individual subscriber, the process continues with step 1014 where agreement engine 216 presents questions that are relevant to an individual subscriber. If the user selects a corporation subscriber, the process continues with step 1016 where agreement engine 216 presents questions that are relevant to a corporation subscriber. If the user selects a trust subscriber, the process continues with step 1018 where agreement engine 216 presents questions that are relevant to a trust subscriber. If the user selects a limited partnership subscriber, the process continues with step 1020 where agreement agent 216 presents questions that are relevant to a limited partnership subscriber. The process may also continue with a general partnership process 1022, a limited liability company process 1024, a retirement plan process 1026, a Massachusetts/Business Trust 1030 process, or another entity process 1028.

The specific questions presented to the user during steps 1014-1030 depend upon the fund type, the subscriber type, and the state of the securities laws at the time of creation of the agreement. Agreement engine 216 only presents questions to the user that are relevant for the selected subscriber type, which decreases the chance of the user becoming confused during the agreement creation process and possibly answering the wrong questions. Agreement engine 216 also reduces the chance of errors by not allowing a user to answer questions in a mutually exclusive fashion. After the user has completed the questionnaire, agreement engine 216 produces an agreement that incorporates the user's answers and appropriate legal text. The agreement includes a cryptographic hash that operates as a digital fingerprint for the agreement. The digital fingerprint is printed at the bottom of every page of the agreement for security purposes. The investor name and the name of the actual subscriber (e.g., a trust) are also printed at the bottom of each page of the agreement. The agreement also includes a representation that the user has not altered anything to this version of the agreement. The investor executes the agreement by printing out and signing the agreement, and then forwards the executed agreement to system administrator 114.

Figure 11:
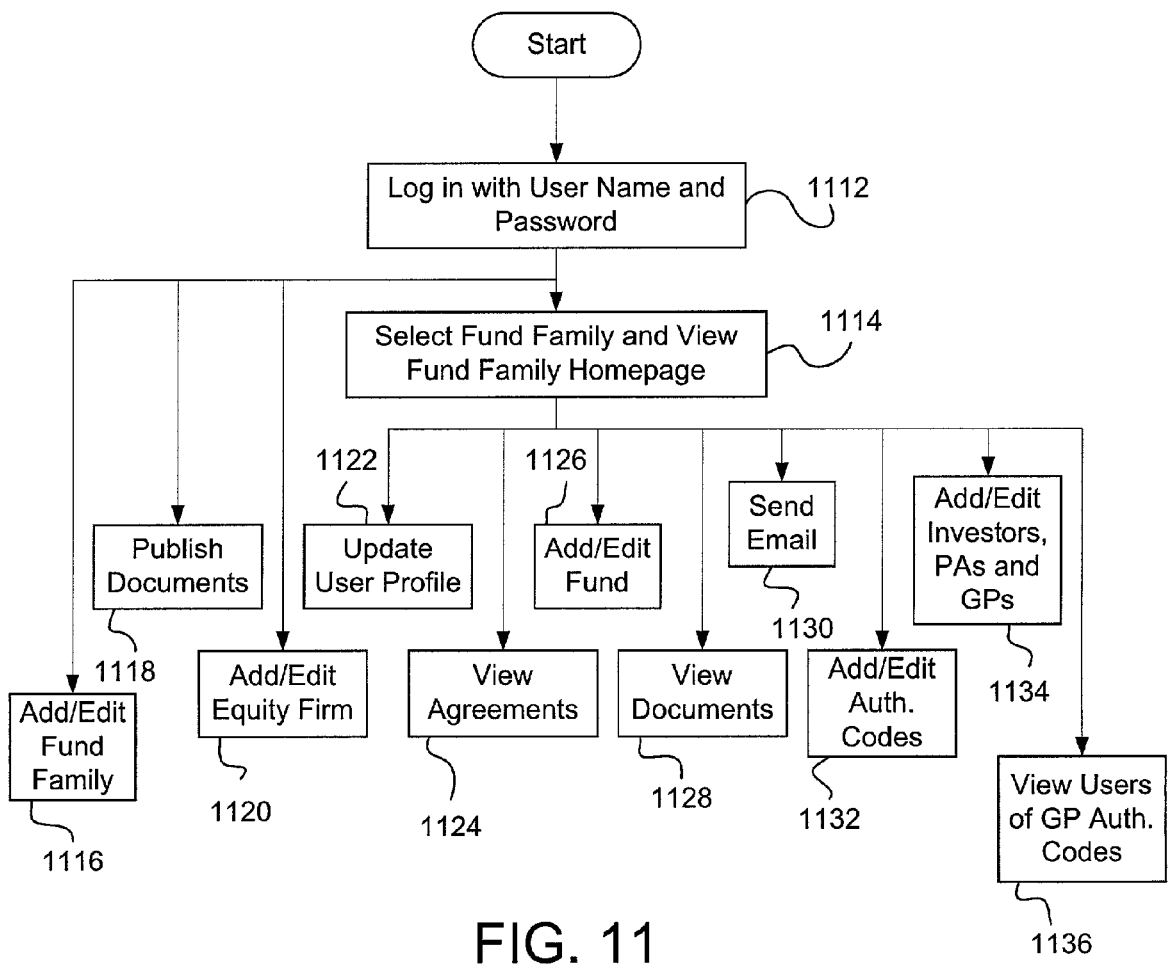
FIG. 11 is a flowchart illustrating interaction of a system administrator with the equity fund application of FIG. 1, in accordance with one embodiment of the invention.

FIG. 11 is a flowchart illustrating interaction of system administrator 114 with equity fund application 122 of FIG. 1, in accordance with one embodiment of the invention. In step 1112, system administrator 114 logs in using a user name and password. System administrator 114 does not enter an authorization code since system administrator 114 is automatically registered for every fund family with system administration privileges. Once logged in, equity fund application 122 presents system administrator 114 with various options. In step 1120, system administrator 114 may add a new equity firm to system 100 or edit an existing equity firm. In step 1116, system administrator 114 may add new fund families for an equity firm or edit existing fund families. System 100 may include any number of equity firms and any number of fund families under an equity firm.

In step 1118, system administrator 114 may publish documents to system 100 by placing documents in fund documents 312 and setting access privileges using document management module 218. Publishing documents is further discussed below in conjunction with FIG. 12. In step 1114, system administrator 114 selects a fund family and view the fund family home page, which presents various options to system administrator 114.

In step 1122, system administrator 114 may update his or her user profile. In step 1124, system administrator 114 may view agreements created by investors. In step 1126, system administrator 114 may add a new fund to the fund family or edit an existing fund in the fund family. In step 1128, system administrator 114 may view documents in fund documents 312. In step 1130, system administrator 114 may send an email to any number of registered users of system 100. In step 1132, system administrator 114 may add or edit authorization codes. In step 1134, system administrator 114 may add new investors, new placement agents (PA), and new general partners (GP) to the fund family, and edit information for existing investors, placement agents, and general partners.

Figure 12:
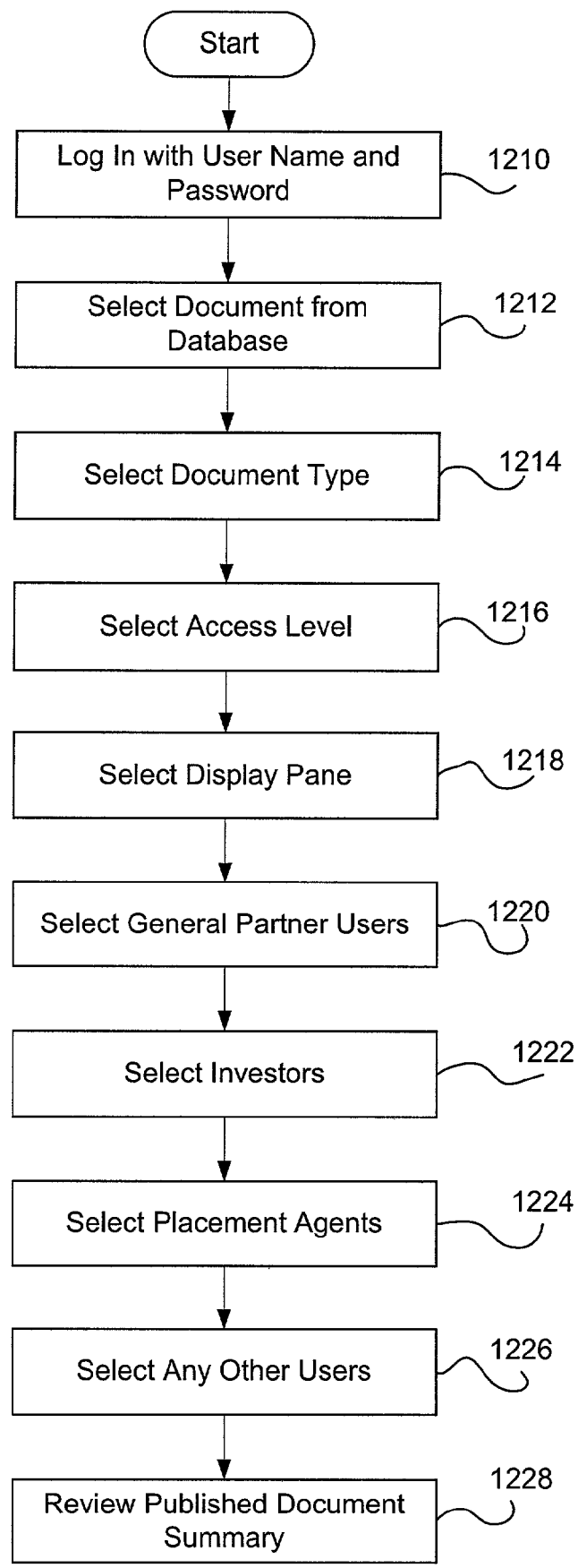
FIG. 12 is a flowchart of method steps for publishing a document to the system of FIG. 1, in accordance with one embodiment of the invention.

FIG. 12 is a flowchart of method steps for publishing a document to system 100 of FIG. 1, in accordance with one embodiment of the invention. System administrator 114 interacts with document management module 218 to determine access to the document. Document access determinations are made on a user category basis with a sweep category to grant access to a specific individual not previously granted access. In step 1210, system administrator 114 logs in using a user name and password. In step 1212, system administrator 114 selects a document from a database (not shown) to be published to fund documents 312. In step 1214, system administrator selects a document type for the document. Document types include, but are not limited to, partnership agreements, private placement memoranda, legal opinions, supplements and amendments to other documents. Then, in step 1216, system administrator 114 selects an access level for the document. Access levels include, but are not limited to, public library (full access), semi-restricted, full-restricted, fund-specific, and investor-specific. Any registered user can view documents in the public library. General partners can view semi-restricted documents from every fund family home page. Full-restricted documents are specific to a particular fund family. System administrator 114 also assigns the MFN status of a document. The MFN status of a document can be changed at any time.

In step 1218, system administrator 114 selects a display pane for the document. For example, the document name may be displayed on a fund family home page in a general materials pane or a investor-specific materials pane. In step 1220, system administrator 114 selects general partner users at the general partner level. At the general partner level, access to the document can be granted to all current and future general partner personnel, or can be granted only to specifically identified general partner personnel. In step 1222, system administrator 114 selects investors at the investor level. At the investor level, access to the document can be granted to all current and future investors, or can be granted only to specifically identified investors. In step 1224, system administrator 114 selects placement agents at the placement agent level. At the placement agent level, access to the document can be granted to all current and future placement agents, none of the placement agents, or only to specifically identified placement agents. In step 1226, system administrator 114 selects any other users to be granted access to the document in the sweep category. The sweep category shows all users registered for the fund family that have not been granted access to the document under any of the prior three levels. System administrator 114 can individually grant access to the document to any or none of these users.

In step 1228, system administrator 114 reviews a published document summary for the document. If system administrator 114 is satisfied with the selections for the document, system administrator 114 publishes the document to fund documents 312. The above publication process is performed for every draft and version of a document. Once a document has been published to system 100, document management module 218 in conjunction with email interface 220 automatically sends an email message to all of the registered users with access to that document as notice that the document is now available.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A system for private equity fund formation, the system comprising:
    a computing network,
    an application server including a memory and a private equity fund application, the application server in communication with the computing network, the private equity fund application further comprising an agreement engine configured to logic configured to
        receive participant information over the computing network,
        generate at least one electronic questionnaire,
        receive investor information over the computing network in response to the at least one electronic questionnaire,
        automatically generate a subscription agreement for the private equity fund, the subscription agreement incorporating the investor information received in response to the at least one questionnaire, the investor information based at least in part on an answer to a question, the question automatically generated in response to an answer to a previous question, wherein the answers to the questions are not received in a mutually exclusive fashion and at least one of the questions is automatically generated based upon a type of the private equity fund and a type of subscriber,
        receive private equity fund information,
        automatically qualify investor participation in the private equity fund based on the private equity fund information and the subscription agreement,
    a fund formation module configured to generate a spreadsheet that summarizes content and status of the subscription agreement, and
    wherein the private equity fund application includes an authorization code generator configured to automatically generate an authorization code when a participant is added to the system, the authorization code representing a specific participant and a specific fund family, and the authorization code used by individuals having a relationship to the specific participant to access fund documents associated with the specific fund family.

2. The system of claim 1, wherein the private equity fund application is further configured to generate a digital fingerprint for the subscription agreement and include the digital fingerprint on each page of the subscription agreement.

3. The system of claim 1, wherein the private equity fund application includes a user registration module configured to register users with the system utilizing a user name and a password.

4. The system of claim 1, wherein the specific participant is an investor.

5. The system of claim 1, wherein the specific participant is a general partner.

6. The system of claim 1, wherein the specific participant is a placement agent.

7. The system of claim 1, wherein the private equity fund application includes a fund formation module configured to generate web pages presented to users via the computing network.

8. The system of claim 7, wherein the fund formation module is further configured to allow participants to be added to the system.

9. The system of claim 8, wherein the fund formation module is further configured to allow a general partner or a placement agent to add an investor to the system.

10. The system of claim 1, wherein the private equity fund application includes an email interface configured to automatically create email messages when a participant is added to the system.

11. The system of claim 10, wherein the email interface is further configured to allow users to create an email message and address the email message to any number of other users.

12. The system of claim 11, wherein the email interface is further configured to allow users to address the email message by category of user.

13. The system of claim 11, wherein the email interface is further configured to allow users to address the email message by individual user.

14. The system of claim 1, wherein the private equity fund application includes a document management module configured to manage access to the fund documents.

15. The system of claim 14, wherein the document management module is further configured to manage a user's access to the fund documents according to an authorization code entered by the user.

16. A method for private equity fund formation, comprising:
    accessing a website;
    registering as a user of the website by selecting a user name and password;
    entering an authorization code to view fund documents, the authorization code automatically generated when a participant is added to a fund family, the authorization code representing a specific participant and a specific fund family, and the authorization code used by individuals having a relationship to the specific participant to access fund documents associated with the specific fund family,
    interacting with the website to automatically generate a subscription agreement for a private equity fund according to investor information, the subscription agreement incorporating the investor information received in response to at least one questionnaire, the investor information based at least in part on an answer to a question, the question automatically generated in response to an answer to a previous question, wherein the answers to the questions are not received in a mutually exclusive fashion and at least one of the questions is automatically generated based upon a type of the private equity fund and a type of subscriber.

17. A method comprising:
    receiving private equity fund information over a computing network under the control of a private equity fund application executing on an application server;
    receiving investor information over the computing network in response to at least one questionnaire generated by the private equity fund application;
    automatically generating a subscription agreement for a private equity fund according to the investor information received in response to the questionnaire, the subscription agreement incorporating the investor information received in response to the at least one questionnaire, the investor information based at least in part on an answer to a question, the question automatically generated in response to an answer to a previous question, wherein the answers to the questions are not received in a mutually exclusive fashion and at least one of the questions is automatically generated based upon a type of the private equity fund and a type of subscriber;

receiving participant information over the computing network;

storing the private equity fund information, the investor information, the subscription agreement, the participant information and one or more fund documents related to the private equity fund as documents in a memory on the computing device, the memory accessible over the computing network under management of the private equity fund application;

viewing the one or more fund documents related to the private equity fund and the subscription agreement over the computing network devices under the management of the private equity fund application;

editing the one or more fund documents related to the private equity fund over the computing network under the management of the private equity fund application, automatically qualify investor participation in the private equity fund based on the private equity fund information and the subscription agreement, and wherein the private equity fund application includes an authorization code generator configured to automatically generate an authorization code when a participant is added to the system, the authorization code representing a specific participant and a specific fund family, and the authorization code used by individuals having a relationship to the specific participant to access fund documents associated with the specific fund family.

* * * * *